United States Patent [19]

Schramm, deceased et al.

[11] Patent Number: 4,510,010
[45] Date of Patent: Apr. 9, 1985

[54] METHOD AND APPARATUS FOR FABRICATING INSULATIVE PANEL

[76] Inventors: Arthur G. Schramm, deceased, late of Scottsdale, Ariz.; by Doralyn A. Hardy, personal representative, 1522 E. San Juan, Phoenix, Ariz. 85014; Jack C. Shaffer, 610 E. Montebello #36, Phoenix, Ariz. 85012

[21] Appl. No.: 506,609

[22] Filed: Aug. 8, 1983

Related U.S. Application Data

[60] Division of Ser. No. 153,072, May 27, 1983, Pat. No. 4,416,715, and a continuation-in-part of Ser. No. 957,665, Nov. 3, 1978, abandoned, which is a continuation-in-part of Ser. No. 937,266, Aug. 31, 1978, abandoned.

[51] Int. Cl.³ ............... B43M 3/00; B32B 3/00; B29C 17/40; B31F 5/00
[52] U.S. Cl. .................. 156/383; 156/442.1; 156/476; 156/478; 156/556; 156/210; 156/462
[58] Field of Search ............... 156/210, 213, 292, 217, 156/205, 383, 442.1, 476, 478, 556, 227, 479, 442.2, 467, 468, 462, 464, 471, 582, 62.2, 62.8, 91, 92, 146, 145; 428/72, 76, 117, 78, 182, 74, 178; 52/299

[56] References Cited

U.S. PATENT DOCUMENTS

| | | | |
|---|---|---|---|
| 1,735,877 | 11/1929 | Payne | 156/40 |
| 1,765,796 | 6/1930 | Kirschbraun | 428/78 |
| 2,342,839 | 2/1944 | Byers | 428/182 |
| 3,526,556 | 9/1970 | Berner | 428/117 |
| 3,528,875 | 9/1970 | MacDonald et al. | 156/462 |
| 3,650,871 | 3/1972 | Bentfors | 428/117 |
| 3,857,752 | 12/1974 | McCoy | 428/74 |
| 3,886,023 | 5/1975 | Deplante | 428/117 |
| 4,057,944 | 11/1977 | Wyatt, Jr. et al. | 52/299 |
| 4,070,839 | 1/1978 | Clem | 428/117 |
| 4,150,186 | 4/1979 | Kazama | 428/178 |
| 4,242,161 | 12/1980 | Hulten et al. | 156/467 |
| 4,274,905 | 6/1981 | Itoh et al. | 156/462 |

*Primary Examiner*—Edward Kimlin
*Assistant Examiner*—L. Falasco
*Attorney, Agent, or Firm*—Don J. Flickinger

[57] ABSTRACT

A press, carried by a first table and having punch and die components, receives a rectangular filler sheet and forms a lateral accordian fold sheet. The accordian fold sheet is lifted from the press by transfer means and placed upon an envelope sheet overlaying a second table. Hinged panels carried by the second table fold the envelope sheet over the accordian fold sheet, forming a rigid compartmentalized panel having an opening along a longitudinal edge. The second table, with the opening upright, moves to a position under a receptacle from which granular loose fill material is entered into the compartments through the opening. Subsequently, flaps extending along the panels move to further fold the envelope sheet and close the opening.

13 Claims, 17 Drawing Figures

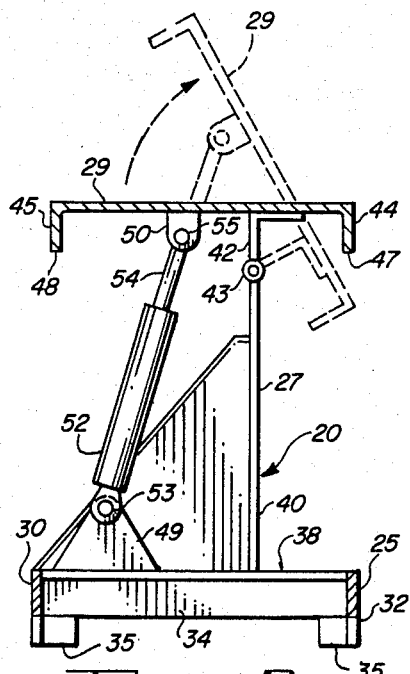
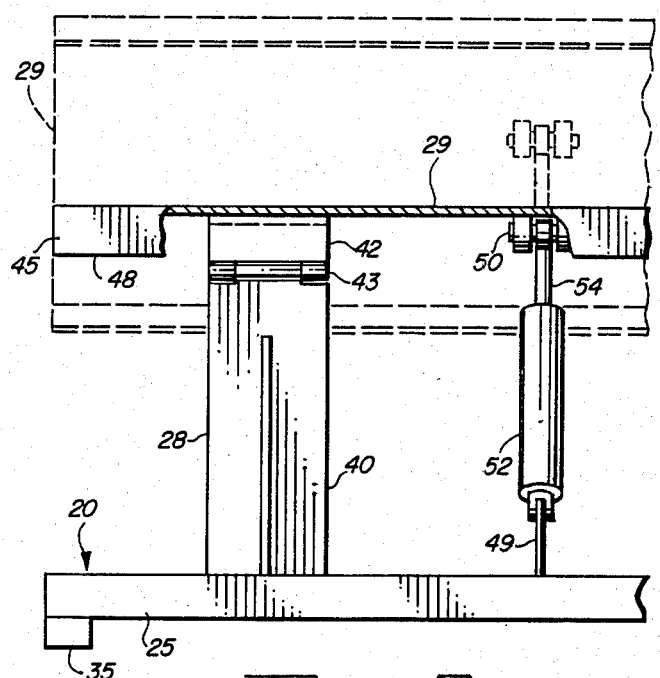
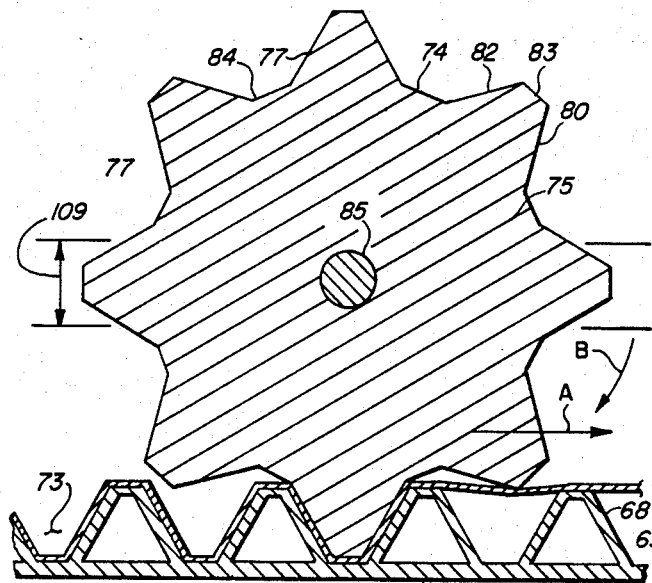
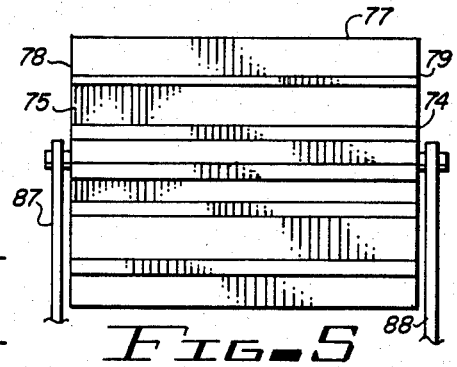
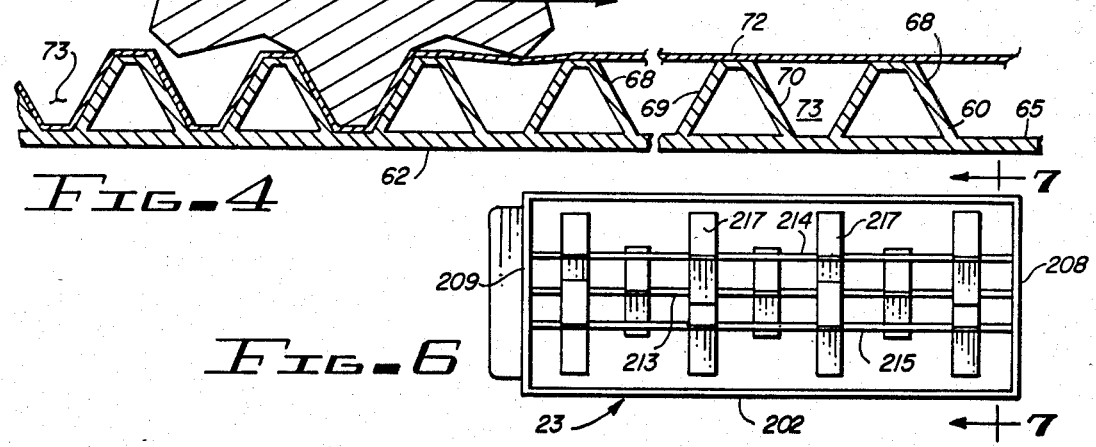

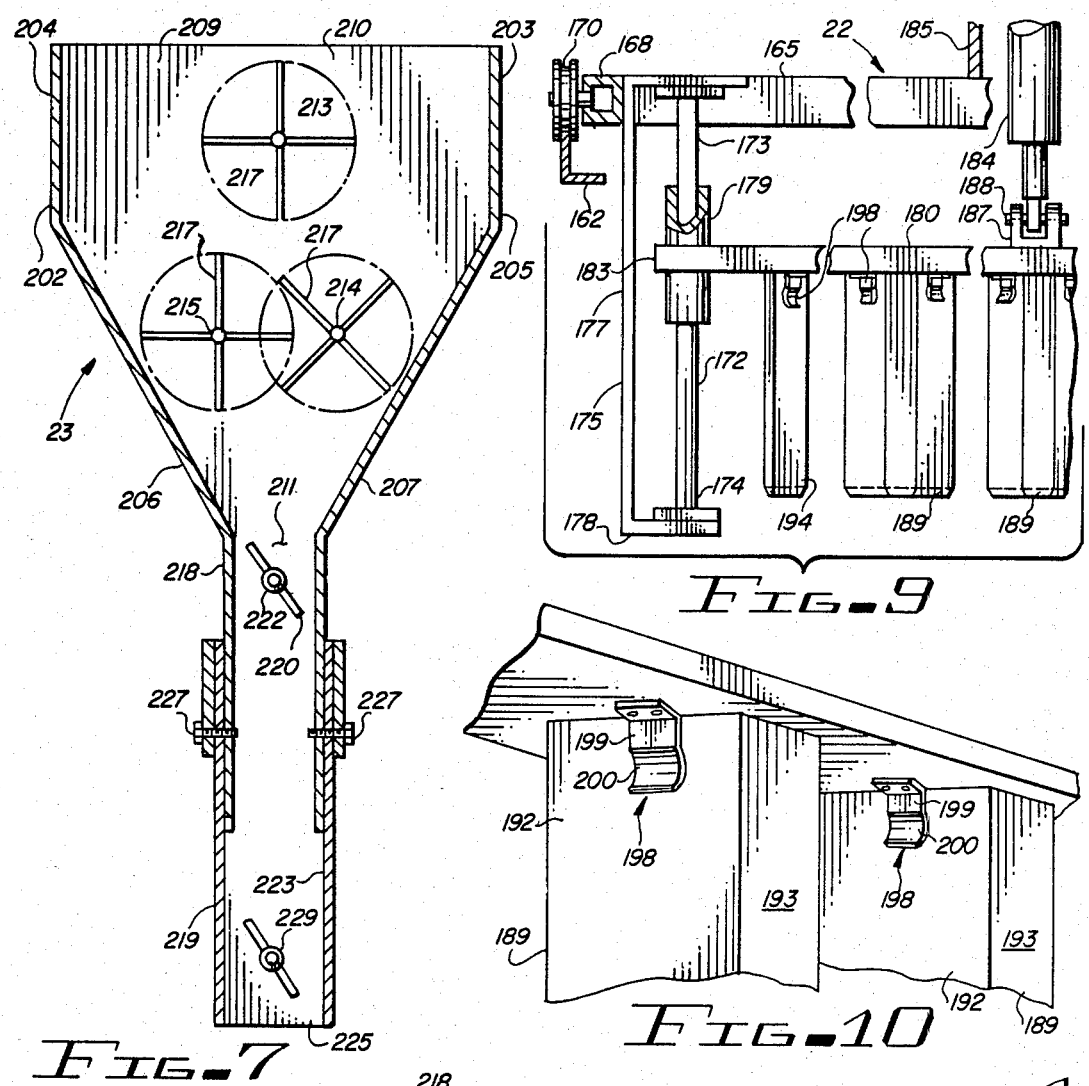
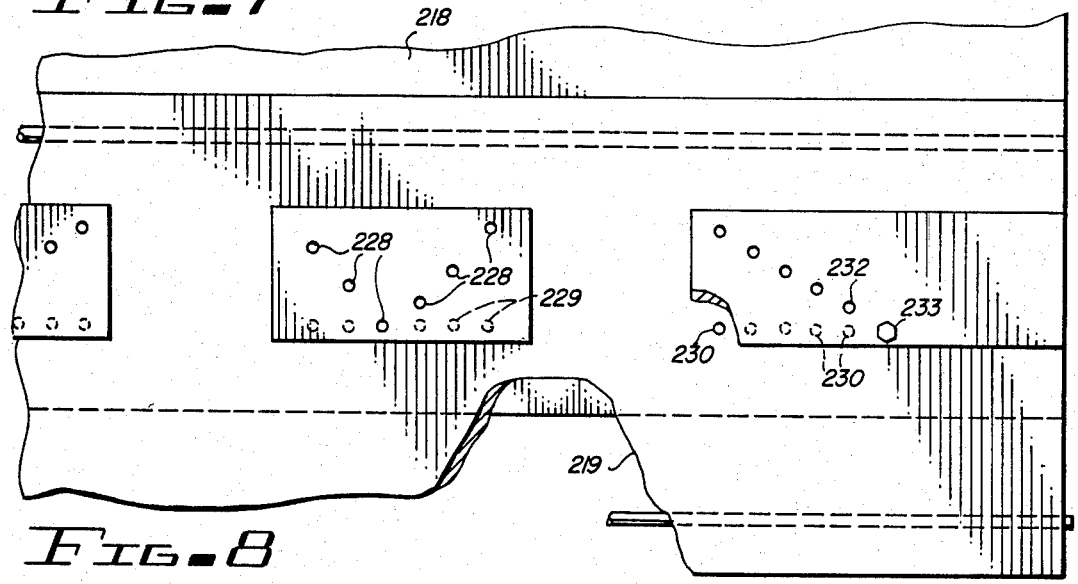

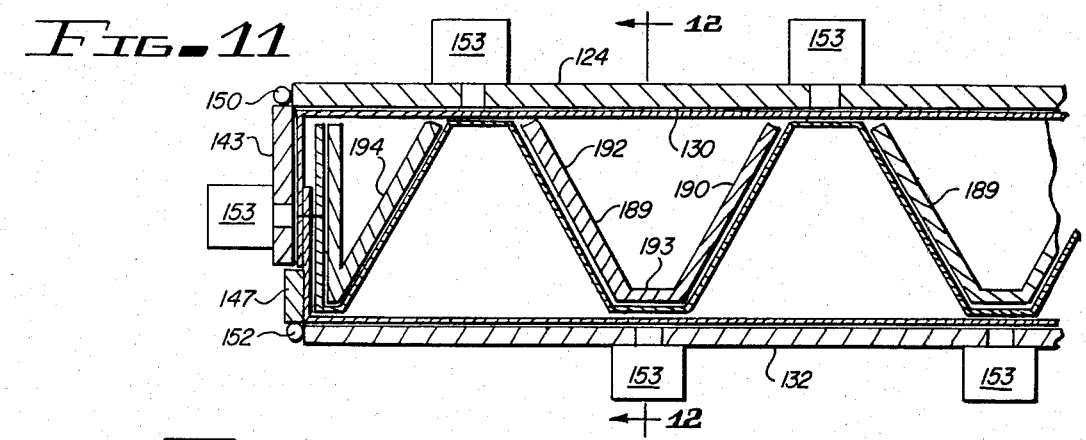
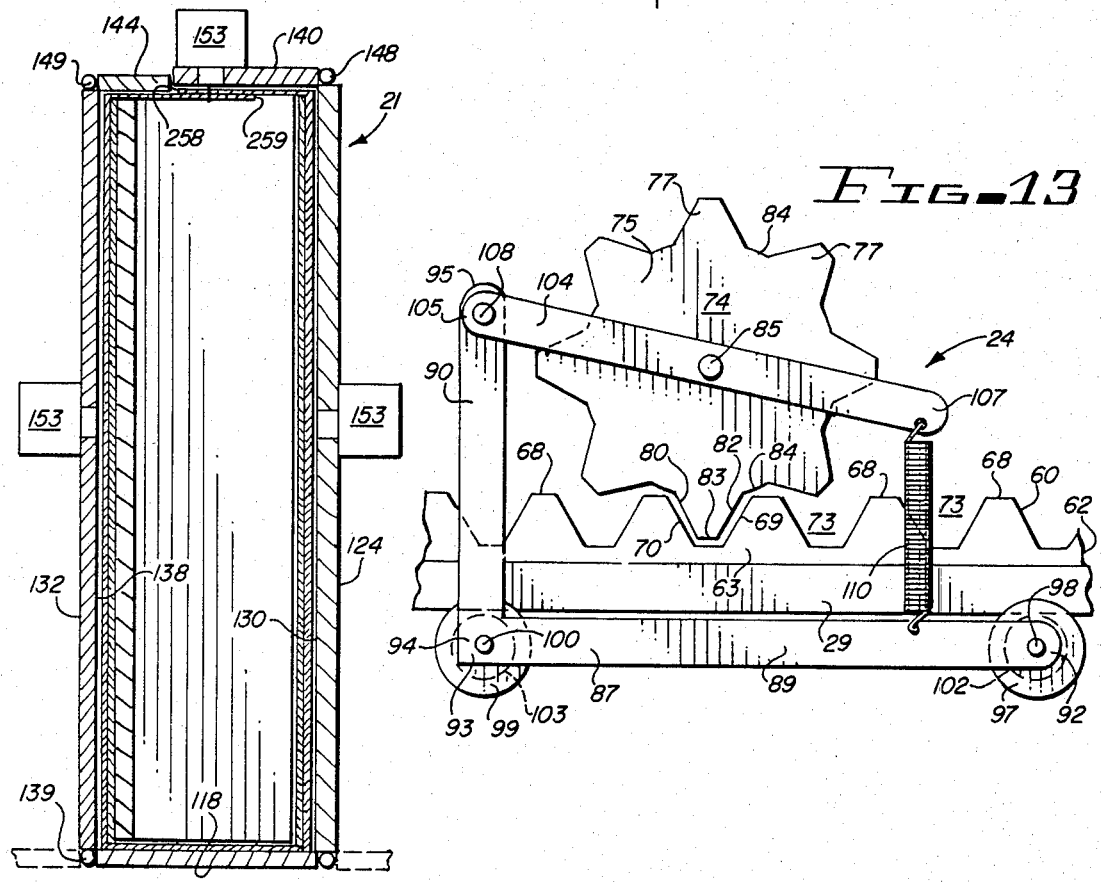

METHOD AND APPARATUS FOR FABRICATING INSULATIVE PANEL

CROSS REFERENCES TO RELATED APPLICATIONS

This application is a division of Ser. No. 153,072 filed May 27, 1980 now U.S. Pat. No. 4,416,715 and a continuation-in-part of co-pending application, Ser. No. 957,665 filed Nov. 3, 1978, abandoned which was a continuation-in-part of application, Ser. No. 937,266 filed Aug. 31, 1978, abandoned.

BACKGROUND

1. Field of the Invention

This invention relates to rigid insulative panels.

More particularly, the present invention relates to method and apparatus for fabricating insulative panels.

In a further aspect, the instant invention concerns method and apparatus for forming an insulative panel or structure having a partitioned envelope containing granular loose fill insulative material.

2. Prior Art

U.S. Pat. No. 2,342,839 issued to Byers, Feb. 29, 1944, discloses an insulating blanket of a flexible type which may be rolled for transportation purposes. The insulating blanket is rolled up and placed in cartons after it leaves the machine on which it is fabricated. Byers insulating blanket is not a rigid structure. It is formed of pockets fabricated of material so as to make the length of the walls of the pockets variable in length. Neither are the pockets of Byers uniformly sized. The pockets have walls which are flexible so as to permit variations in the amount of insulating material which may be emplaced therein. Specifically, the patent discloses that the walls of the pockets shall be corrugated to allow for variations in length thereof. The Byers reference teaches that insulation material may be formed into bodies which may be placed in the flexible walled pocket of the insulating blanket as the insulation blanket is fabricated.

Further, the insulating material of Byers is of a type which will readily retain its position. This precludes the use of the efficient granular loose fill insulation well known in the prior art but which, until now, has been limited in its use to pneumatic or poured application in horizontal installations. This is readily apparent in that the Byers reference discloses that it is not essential that there be complete closure of the ends of the flexible pockets in which the bodies of insulating material are emplaced. The more efficient loose fill insulating material is of a type which is granular and can pass through a screen, and thus, it would be impracticable to use such granular loose fill material in the flexible insulating blanket disclosed by Byers.

Patent application, Ser. No. 937,266 discloses a rigid insulation panel especially adapted for use with granular loose fill insulative material. The structure includes an envelope divided into a plurality of partitioned compartments by laterally extending panels. Each compartment is filled with insulative material, such as treated ground paper.

Briefly, as set forth in greater detail in the above identified patent application, the use of treated ground paper offers numerous advantages as an insulative material. Especially noted is the increased insulative value over conventional material, and the attendant energy savings. Also, the use of ground paper, being manufactured from recycled waste material, is conservative of natural resources.

Proper packaging of granular loose fill insulative material, such as ground paper, into an expediently usable insulative batt has defied solution by the prior art. The teachings of patent application, Ser. No. 927,266, provides a resolution to the problem. Not set forth in the application, however, is apparatus or method by which to produce the novel insulative panel.

Accordingly, it is an object of the present invention to provide a method for fabricating a rigid insulative panel.

Another object of the invention is the provision of a method of producing an insulative structure, including granular loose fill insulative material.

And another object of the invention is to provide apparatus in which the method can be practiced.

Still another object of this invention is the provision of a method for producing a granular loose fill material filled insulative panel that is relatively unaffected by settling of the material.

Yet another object of the invention is the provision of a method of producing an insulative panel, having partitioned rigid compartments within the insulative panel.

And still another object of the invention is to provide an apparatus for forming an accordion fold sheet and wrapping the accordian fold sheet in an envelope to form a rigid panel.

A further object of the instant invention is the provision of an apparatus which will fill said envelope with a controlled quantity of granular loose fill material to form a rigid insulative panel.

And a further object of the invention is to provide apparatus and method for closing the envelope after filling.

Still a further object of the invention is the provision of an apparatus which will fabricate a rigid insulative panel in accordance with variable methods.

Yet a further object of the invention is to provide a relatively simple method of producing a rigid insulative panel.

And still a further object of this invention is the provision of an apparatus which is adapted to be operated manually, or alternately include automatic features.

And yet a further object of the invention is to provide an apparatus in accordance with the foregoing which is relatively uncomplicated and which is readily operable without special skills.

SUMMARY OF THE INVENTION

Briefly, to achieve the desired objects of the instant invention in accordance with a preferred embodiment of the apparatus thereof, first provided is a base which supports a first table and a second table. A press carried by the first table receives a filler sheet and forms a lateral accordian fold sheet therefrom. The second table receives an envelope sheet and the accordian fold sheet. First and second rectangular panels hingedly affixed along the longitudinal edges of the second table are contractively movable to fold the envelope sheet against the faces of the accordian fold sheet to form a rigid partitioned envelope having an open top. Next provided is a receptacle for holding a supply of granular loose fill insulative material. Filler means cooperate between the receptacle and the envelope for depositing a pre-determined quantity of insulative material into the envelope through the open top thereof.

Of immediate concern in connection with the instant invention is a thermal insulation structure manufactured predominantly from cellulosic or wood fibers. The material is characteristicly granular and can be passed through a screen. Standards for insulation of the type under discussion are set forth in Federal Specification HH-I-515D. Termed "loose fill" the material is intended for pneumatic or poured application, especially in horizontal structures such as attic space.

In accordance with a further embodiment of the invention, the press includes a die having a plurality of spaced apart upstanding die elements defining a plurality of spaced apart recesses therebetween. A press, having a plurality of spaced apart punch elements extending therefrom, is movable over the die with the punch elements being matingly receivable within the recesses between the die elements for impressing lateral portions of the filler sheet into the recesses and forming the accordian fold sheet. Also provided are transfer means for lifting the accordian fold, or corrugated sheet from the press and placing the accordian fold sheet upon a longitudinal edge upon the second table.

In accordance with a still further embodiment of the invention, the second table is movable between a normal position and a position wherein the envelope is aligned to receive insulative material from the receptacle. Further included are flaps hingedly affixed along the panels for further folding a top flap portion of the envelope sheet to close the top face of the envelope opening.

The method, in accordance with a preferred embodiment thereof, includes the steps of bending a rectangular divider sheet at spaced apart lateral locations to form a lateral accordian fold sheet; folding an envelope sheet along spaced apart longitudinal fold lines against the opposite faces of the accordian fold sheet; folding the marginal end portions, or top flaps, of the envelope sheet inwardly against the lateral edges of the accordian fold sheet; filling the envelope with granular loose fill insulative material; and folding the marginal edge portions of the envelope inwardly to close the top face of the envelope.

DESCRIPTION OF THE DRAWINGS

The foregoing and further and more specific objects and advantages of the instant invention will become readily apparent to those skilled in the art from the following detailed description of preferred embodiments thereof taken in conjunction with the drawings, in which:

FIG. 2 is an enlarged vertical sectional view taken along line 2—2 of FIG. 1 and especially illustrating the press carrying table thereof, an alternate position being shown in broken outline;

FIG. 3 is a side elevation view of that portion of the apparatus seen in FIG. 2, an alternate position being shown in broken outline;

FIG. 4 is an enlarged fragmentary vertical sectional view taken along the line 4—4 of FIG. 1 and showing further detail of the press thereof;

FIG. 5 is a front elevation view of the punch component of the press as seen in FIGS. 1 and 4;

FIG. 6 is a top plan view of the receptacle for holding a supply of granular loose fill insulative material in accordance with the embodiment of FIG. 1;

FIG. 7 is an enlarged vertical sectional view taken along the line 7—7 of FIG. 6;

FIG. 8 is an enlarged fragmentary side elevation view of the receptacle of FIG. 7;

FIG. 9 is an enlarged elevation view of the transfer means of the apparatus of FIG. 1, portions thereof being broken away;

FIG. 10 is an enlarged fragmentary perspective view of a portion of the transfer means of FIG. 9;

FIG. 11 is an enlarged fragmentary horizontal sectional view taken along the line 11—11 of FIG. 1, especially illustrating the holding table thereof and further including a portion of the transfer means;

FIG. 12 is a vertical sectional view taken along the line 12—12 of FIG. 11;

FIG. 13 is a fragmentary side elevation view of the press of FIG. 4 and especially illustrating preferred guide means for moving the punch component relative the die component;

DETAILED DESCRIPTION OF THE INVENTION

Figure 1:
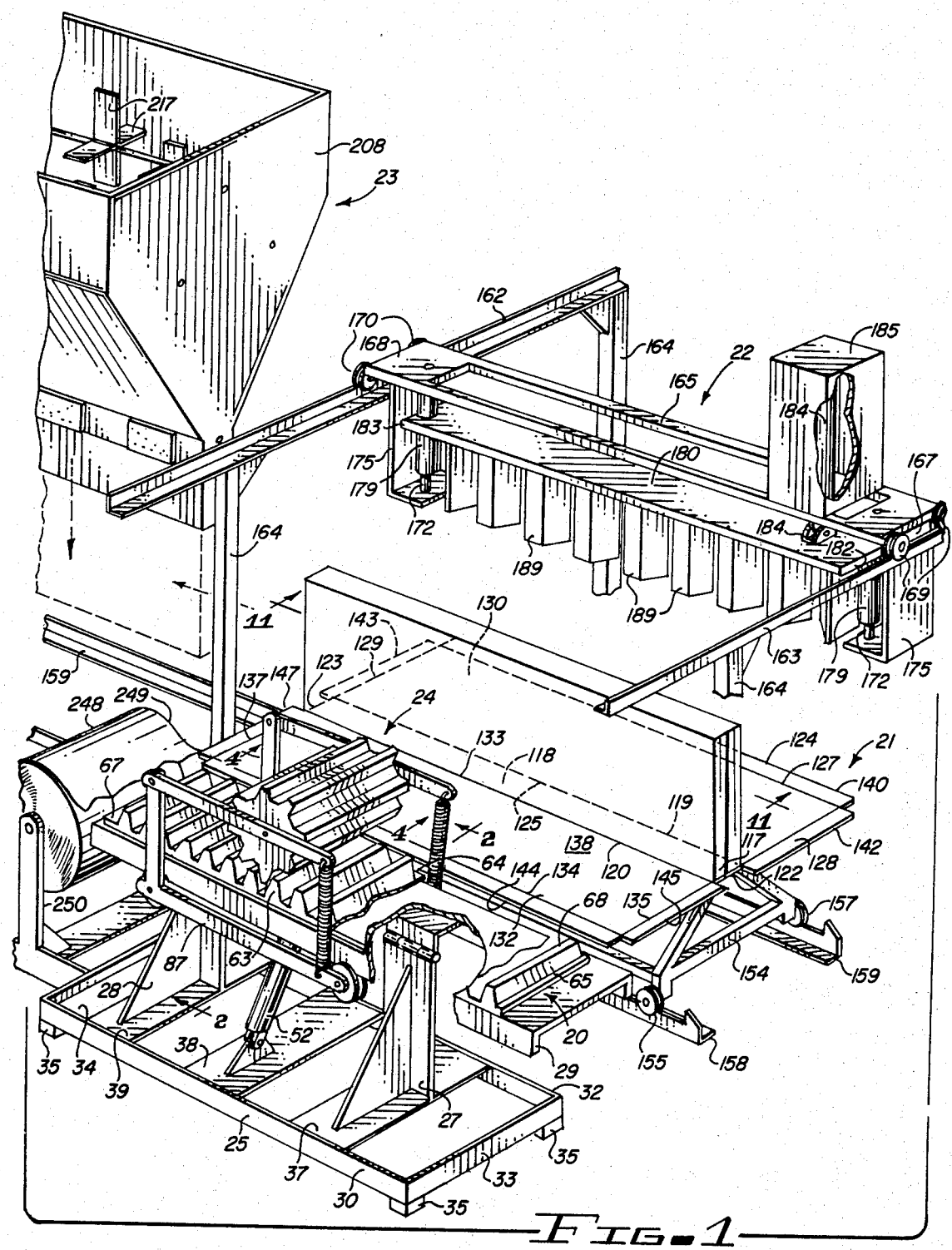
FIG. 1 is a perspective view of a preferred embodiment of an apparatus constructed in accordance with the teachings of the instant invention for fabricating insulative panels, portions thereof being broken away for purposes of illustration.

Turning now to the drawings, in which like reference characters indicate corresponding elements throughout the several views, attention is first directed to FIG. 1, which shows a preferred embodiment of an apparatus for fabricating an insulative panel, in accordance with the teachings of the instant invention and including a first table, a second table, a transfer means, and a receptacle, generally designated by the reference characters 20, 21, 22 and 23, respectively. Press 24, carried by first table 20, receives a filler or divider sheet and impresses the filler sheet with lateral indentations, alternating ridges and grooves, to form an accordian fold or corrugated sheet. Transfer means 22 retrieves the accordian fold sheet from press 24 and transfers the accordian fold sheet to second table 21 which has previously received the envelope sheet. Table 21 operates to fold the envelope sheet about the filler sheet to first partially form an insulative panel. Receptacle 23 holds a supply of granular loose fill insulative material and dispenses the material in controllable quantities. Second table 21 moves between the illustrated position and a second position under receptacle 23 for filling the partially completed insulative panel. Thereafter, second table 21 is movable to the initial position for completion of the insulative panel.

Alternatively, transfer means 22 may replace press 24 by having transfer means move into position over the filler sheet. Movement of transfer means downward so as to cause projection 189 to mate with die 60 will impress the filler sheet with the lateral indentations to form the accordian fold sheet. Vacuum ports on transfer means 22 then permit the corrugated divider sheet to be transported by transfer means 22 to second table 21 from table 20.

The foregoing is a synopsis of the apparatus of the instant invention set forth for purposes of orientation. Each component of the apparatus will hereinafter be set forth in detail.

First table 20, as further illustrated in FIGS. 2 and 3, broadly includes base 25, a pair of spaced apart upright support members 27 and 28, and top 29. Base 25 is generally rectangular, having spaced apart parallel side members 30 and 32 which are joined at respective ends by parallel lateral members 33 and 34. A leg 35 depends from each corner formed by side members 30 and 32 and lateral members 33 and 34. Three spaced apart horizontal support members 37, 38 and 39 extend transversely between side members 30 and 32.

Upright support members 27 and 28 extend upwardly from horizontal support members 37 and 39, respectively. Upright support members 27 and 28, being similar, include a lower section 40 and an upper section 42 which are joined by hinge 43. It is noted that hinges 43 are parallel to the longitudinal axis of firts table 20. Top 29 is secured to upper sections 42 of each upright support member 27 and 28. Top 29 includes downturned marginal portions 44 and 45 extending along respective longitudinal sides and terminating with downwardly directed edges 47 and 48, respectively.

Base bracket 49 extends upwardly from horizontal support plate 38 and is aligned with bifurcated bracket 50 depending from top 29. Hydraulic cylinder 52 is pivotally connected to base bracket 49 and by pin 53, while operating ram 54 extending from cylinder 52 is pivotally connected to bifurcated bracket 50 by pin 55. Cylinder 52 and ram 54 are part of a commercially available double acting hydraulic cylinder assembly of a type well known to those skilled in the art and made commercially available by various suppliers. The hydraulic cylinder assembly further includes controls, not specifically herein illustrated, but as will be readily apparent to those skilled in the art for selectively extending and retracting ram 54 relative cylinder 52. Accordingly, top 29, pivoting at hinges 43, is movable between positions shown in solid line and broken out-line in FIGS. 2 and 3. It is preferred that top 29 is substantially horizontal when ram 54 is fully retracted and that top 29 is substantially vertical when ram 54 is fully extended. It is noted that top 29 of first table 20 tilts in a direction toward second table 21.

Press 24 carried by first table 20 is described with particular reference to FIGS. 1, 4, 5 and 13. Die 60 includes base plate 62 which rests upon top 29. Base plate 62 is generally rectangular having longitudinal edges 63 and 64 and lateral edges 65 and 67 and is proportioned and sized to approximate top 29. Plate 62 is secured to top 29 by bolts or other conventional means.

A plurality of identical die elements 68 project upwardly from base plate 62. Die elements 68 are spaced apart and extend transversely across plate 62. Each die element 68 includes first and second planar sides 69 and 70 which converge in an upward direction. In accordance with the immediately preferred embodiment of the invention, sides 69 and 70 do not continue to an apex, but rather are truncated by upper planar surface 72, which is parallel to plate 62. A recess 73 is formed between each adjacent pair of die elements 68. Again, in accordance with the immediately preferred embodiment of the invention, recess 73 is an inverted mirror image of die element 68.

Punch 74 includes generally cylindrical body 75, having punch elements 77 extending therefrom. Cylindrical body 75, having first and second ends 78 and 79, has a length generally corresponding to the width of die 60. Punch elements 77 are radially spaced about body 75 and extend longitudinally thereof. Each punch element 77 includes first and second convergent sides 80 and 82, respectively, and truncating nose 83. Punch 74 is rotatably carried by shaft 85. The several noses 83 and the several flats 84 are tangential to the axis of rotation of shaft 85.

Guide means for moving punch 74 relative die 60 includes a pair of L-shaped frame members 87 and 88 which are outboard of downturned marginal portions 44 and 45 of top 29. Each L-shaped frame member 87 and 88 includes a substantially horizontal leg 89 and a substantially vertical leg 90. Horizontal leg 87 has first and second ends 92 and 93, while vertical leg has first and second ends 94 and 95. It is noted that second end 93 of horizontal leg 89 is coincident with the first end 94 of vertical leg 90.

A first guide roller 97 is pivotally carried proximate first end 92 by axle 98 and a similar second guide roller 99 is pivotally secured to second end 93 by axle 100. Annular grooves 102 and 103 are formed in first guide roller 97 and second guide roller 99, respectively. Although L-shaped frame member 88 is not completely illustrated in the drawings, it is to be understood that L-shaped frame member is a mirror image and corresponding to L-shaped frame member 87. Accordingly, a pair of guide rollers 97 and 99 are affixed to L-shaped frame member 88.

Annular grooves 102 and 103 of guide rollers 97 and 99, respectively, of L-shaped frame member 87 are engaged with downwardly directed edge 48 of top 29. Similarly, grooves 102 and 103 of guide rollers 97 and 99, respectively, of L-shaped frame member 88 are engaged with downwardly directed edge 47 of top 20. Due to the engagement of respective grooves with the respective downturned edges, L-shaped frame members 87 and 88 are movable in a longitudinal direction relative top 29 and are restrained from movement in a direction upwardly therefrom.

A first arm 104 having first and second ends 105 and 107 is pivotally connected to second end 95 of vertical leg 90 of L-shaped frame member 87 by pin 108. A second arm 109, generally parallel to first arm 104 and having corresponding elements, is similarly pivotally connected to L-shaped frame member 88. Each arm 104 and 109 is urged downwardly by a tension spring 110 extending between horizontal leg 87 and second end 107 of the respective arm.

Shaft 85, at either end thereof, projects beyond first and second ends 78 and 79 of punch 74 and is journaled in arms 104 and 109 intermediate the respective ends thereof. Springs 110 bias punch 74 downwardly to a normal position against die punch 60. Referring more specifically to FIG. 4, it is seen that as the guide means, including L-shaped frame members 87 and 88, move in the direction of arrow A, punch 74 rotates in the direction of arrow B. During movement, each punch element 77 is matingly received in a respective recess 73. A description of the function of table 20 and press 24, as integral components of the apparatus of the instant invention, will be included in the description of the function of the apparatus following the description of the structure of the several preferred components of the apparatus.

Second table 21, illustrated in FIGS. 1, 11 and 12, is preferably spaced from and parallel to first table 20. Second table 21 includes a generally rectangular section 117, having top surface 118, spaced apart first and second longitudinal edges 119 and 120, respectively, and first and second lateral edge 122 and 123 extending therebetween. A first rectangular panel, having inner and outer longitudinal edges 125 and 127, first and second lateral edges 128 and 129 and inner face 130, is hingedly affixed to center section 117 by hinge assembly 131. Hinge 131, which may be a single hinge or a plurality of hinges, joins inner longitudinal edge 125 and panel 124 to first longitudinal edge 119 of center section 117. A second rectangular panel 132, having inner and outer longitudinal edges 133 and 134, respectively, first and second lateral edges 135 and 137 and inner face 138 is secured to center section 117 by hinge 139 which joins edges 120 and 133.

Each rectangular panel 124 and 132 has hingedly affixed flaps extending along each free edge. It is noted that the flaps associated with panel 124 are wider than the flaps associated with panel 132. Wide longitudinal flap 140 and first and second wide lateral flaps 142 and 143 are hingedly affixed to edges 127, 128 and 129, respectively, of panel 124. Correspondingly, narrow longitudinal flap 144 and first and second narrow lateral flaps 145 and 147 are carried by edges 134, 135 and 137 of second panel 132. The combined width of each corresponding pair of flaps, 142 and 145, 140 and 144, and 143 and 147, approximates the width of center section 118.

Hinge 148 securing flap 140 to panel 124 and hinge 149 securing flap 144 to panel 32 are seen in FIG. 12 as are previously described hinges 131 and 139. Hinge 150, securing flap 143 to panel 124 and hinge 152 connecting flap 147 to panel 132 are seen in FIG. 11. The hinges securing flap 142 to panel 124 and flap 145 to panel 32 are not specifically herein illustrated, but are analogous to the illustrated hinges 150 and 152.

Panels 124 and 132 are contractively movable. That is, panels 124 and 132 move between a normal or rest position, as seen in FIG. 1, in which the panels lie in substantially the same plane as center section 118 to a second or operating position, as seen in FIG. 12, in which panels 124 and 132 are mutually parallel and perpendicular to center section 118. The several flaps move between a normal or rest position, substantially in the plane of the respective panel, to a second or operative position which is inwardly substantially perendicular to the respective panel. Several stapling heads, of a commercially available type, are carried by the panels 124 and 123 and the wide flaps 140, 142 and 143. The preferred placement of stapling heads 153 will be discussed presently.

Center section 117 is mounted upon a carriage 154 having two pair of spaced apart guide wheels 155 and 157. In the illustration of FIG. 1, only one wheel of each pair of guide wheels 155 and 157 is seen. Carriage 154, including the two pairs of guide wheels 155 and 157, is of conventional design, as will be readily apparent to those skilled in the art. Accordingly, further description of carriage 154 will not be made. Rails 158 and 159 are parallel and spaced to correspond with guide wheels 155 and 157. Carriage 154 is movable along rails 158 and 159 between a first or normal position parallel to and aligned with first table 20 and a second position wherein center section 117 of second table 21 resides under receptacle 23. Rails 158 and 159 are considered to be a part of the base of the entire fabricating apparatus, as is base 25 of first table 20.

Transfer means 22 is illustrated in FIGS. 1, 9, 10 and 11. Transfer means 22 includes a superstructure having parallel guide tracks 162 and 163, supported at an elevated location by columns 164. Guide tracks 162 and 163 are perpendicular to first table 20 and second table 21. Although not specifically illustrated, it will be appreciated by those skilled in the art that each column 164 may be provided with a suitable base. Alternatively, for purposes of alignment, base members may be provided which are secured to the base 25 of the first table 20, rails 158 and 159, the base portion of second table 21, and columns 164.

A trolley, including frame member 165 having first and second ends 167 and 168 is movable along guide tracks 162 and 163 by means of first and second pairs of sheaves 169 and 170. The first pair of sheaves 169 are rotatably affixed to the first end 167 of frame member 165 and ride upon guide track 163. The second pair of sheaves 170 are rotatably affixed to the second end 168 of frame member 165 and roll along guide track 162.

A pair of aligned guide pins 172, having upper ends 173 and lower ends 174, depend from frame member 165 proximate first and second ends 167 and 168. Upper end 173 is secured directly to frame member 165. A pair of angled brackets 175, having horizontal sections 177 and inwardly turned lower ends 178 depend from frame member 165. Inwardly turned ends 178 support a respective lower end 174 of guide pins 172.

A bushing 179 is slidably disposed upon each guide pin 172. Plate 180, having first end 182 and second end 183 is secured proximate respective ends thereof to bushings 179. Intermediate ends 182 and 183, bifurcated bracket 184 extends upwardly from plate 180. A hydraulic cylinder 184 is carried by frame member 165 and supported in a vertical position by box-like structure 185. Ram 187, reciprocally operable within hydraulic cylinder 84 is secured at the free end thereof to bifurcated bracket 184 by pin 188.

A plurality of spaced projections 189, as also seen in FIG. 11, depend from plate 180. Each projection 189 includes first and second sides 190 and 192 which converge in a direction toward first table 20. Sides 190 and 192 do not converge, but are truncated by end 193. First side 190 and second side 102 of projection 189 has a slope and a width generally corresponding to first side 69 and second side 70, respectively, of die element 68. Similarly, end 103 has a width generally corresponding to the width of base plate 62 between die elements 68. Further, the several projections 189 are spaced apart according to the spacing between the several recesses 73 of die 60.

Projections 189 can be considered as intermediate projections. An end projection 194 depends from plate 180 at either end of the several projections 189. Each end projection 194 includes a first side 105 which is angled to mate with a respective side of the corresponding die element 68. Each end projection further includes a second side 197 which is perpendicular to the axis of the row of projections.

In an alternative embodiment projections 189 on transfer means 22 may serve the function of press 24 and thus eliminate press 24. This is done by moving transfer means over and down upon filler sheet 24 so as to cause projections 189 to mate with die elements 68 to form the accordian fold sheet 262. Vacuum port on transfer means 22 then maintains accordian fold sheet in contact with projections 189 as transfer means moves accordian fold sheet 252 from table 20 to table 21 and positions accordian fold sheet 252 on envelope sheet 257.

A second alternative would provide punch elements 77 of press 24 as individual, independently operated punch elements, i.e., there would be no cylindrical body 75, but rather each punch element would be independently operable by means such as the hydraulic cylinder assemblies disclosed herein. Once the individual punch elements 77 had been individually and sequentially pressed down upon filler sheet 248 to form accordian fold sheet 252, all punch elements 77 would be raised to clear passage for transfer means 22 to remove accordian fold sheet 252 from table 22 to table 21 where accordian fold sheet 252 is positioned on envelope sheet 257.

The two alternative embodiments of means for forming accordian fold sheet 252 are offered here to illustrate that a press 24 with a cylindrical body 75 is but one of many means by which the accordian fold sheet may be derived within the spirit and scope of the invention.

A plurality of fingers 198 depend from plate 180, one finger being adjacent each side 190 and 192 of each projection 189. Each finger 198 includes a substantially straight section 199 which depends from plate 180 in spaced parallel relationship to the respective side 190 or 192 and a concave section 200 at the lower end thereof, which touches or nearly touches the respective side 190 or 192. Preferably, fingers 198 are fabricated of spring tempered steel.

Receptacle 23, as illustrated in FIGS. 1, 7 and 8, includes generally parallel side walls 202 and 203, having substantially vertical upper sections 204 and 205, respectively, and inwardly directed lower sections 206 and 207, respectively. First end wall 208 and second end wall 209 extend between end walls 202 and 203, forming a vessel having an open top 210 and an elongate opening 211 along the bottom thereof. First, second and third shafts 213, 214 and 215 extend longitudinally of receptacle 23, generally parallel to sides 202 and 203 and rotatably journaled in ends 208 and 209. A plurality of blades 217 are carried by each shaft 213, 214 and 215. Preferably, blades 217 are grouped in perpendicular pairs which are spaced periodically along each shaft. For optimum operation, it is preferred that shaft 213 is located near the top center of vessel 23, while shafts 215 and 214 are placed on the same horizontal plane near the bottom of vessel 23, such that blades 217 pass in close proximity to lower sections 206 and 207 and rotate in overlapping circles. While not specifically illustrated, it will be appreciated by those skilled in the art, shafts 213, 214 and 215 can be made to rotate by various means. For example, an end of each shaft can project beyond one of the ends 208 or 209 and have a pulley, sprocket or other device mounted thereto to receive power input, or alternately be provided with a crank for manual input.

Filler means in the form of upper and lower tubular telescoping elements 218 and 219 depend from receptacle 23. Each telescoping element 218 and 219 is substantially rectangular in cross section, element 218 having a cross section proximating opening 211.

An upper butterfly valve 220, rotatably carried by shaft 222, journaled within upper telescoping element 218, selectively opens and closes opening 211. Lower butterfly valve 223, carried by shaft 224, rotatably journaled in lower telescoping element 219, selectively opens and closes opening 225 in the bottom of lower telescoping element 219. The distance between butterfly valves 220 and 223 controls the quantity of material released during a single cycle from receptacle 23, as will be further described presently. The distance between butterfly valves 220 and 223 is selectively adjustable by bolts 227 which pass through lower telescoping element 219 and threadedly engage upper telescoping element 218. For this purpose, a first V-shaped pattern of apertures 228 extend through lower element 219. Apertures 228 extend upwardly in two sloping rows, the apertures being incrementally spaced vertically and horizontally. A substantially horizontal row of threaded apertures 229 extend through upper telescoping member 218. The spacing between each aperture 229 corresponds to the horizontal increments between apertures 228. Accordingly, as lower telescoping section 219 is moved vertically by the defined increments, an aperture 228 will align with a corresponding threaded aperture 229 to receive a bolt 227. Preferably, several arrangements of apertures 228 and corresponding threaded apertures 229 are spaced along telescoping elements 218 and 219. A similar arrangement incorporating a substantially horizontal row of threaded apertures 230 in upper telescoping element 218 and an angular disposed row of clearance holes 232 in lower telescoping element 219 for bolt 233 is situated at either end of each of the previously described adjusting means.

A method of fabricating an insulative panel in accordance with the teachings of the instant invention is best described in connection with FIG. 17, which shows, in sequential illustration, the material used and the major steps performed. The function of the apparatus for which the structure has been previously described, will also be described with specific reference to FIG. 17 and general reference to the previously noted Figs.

Figure 17:
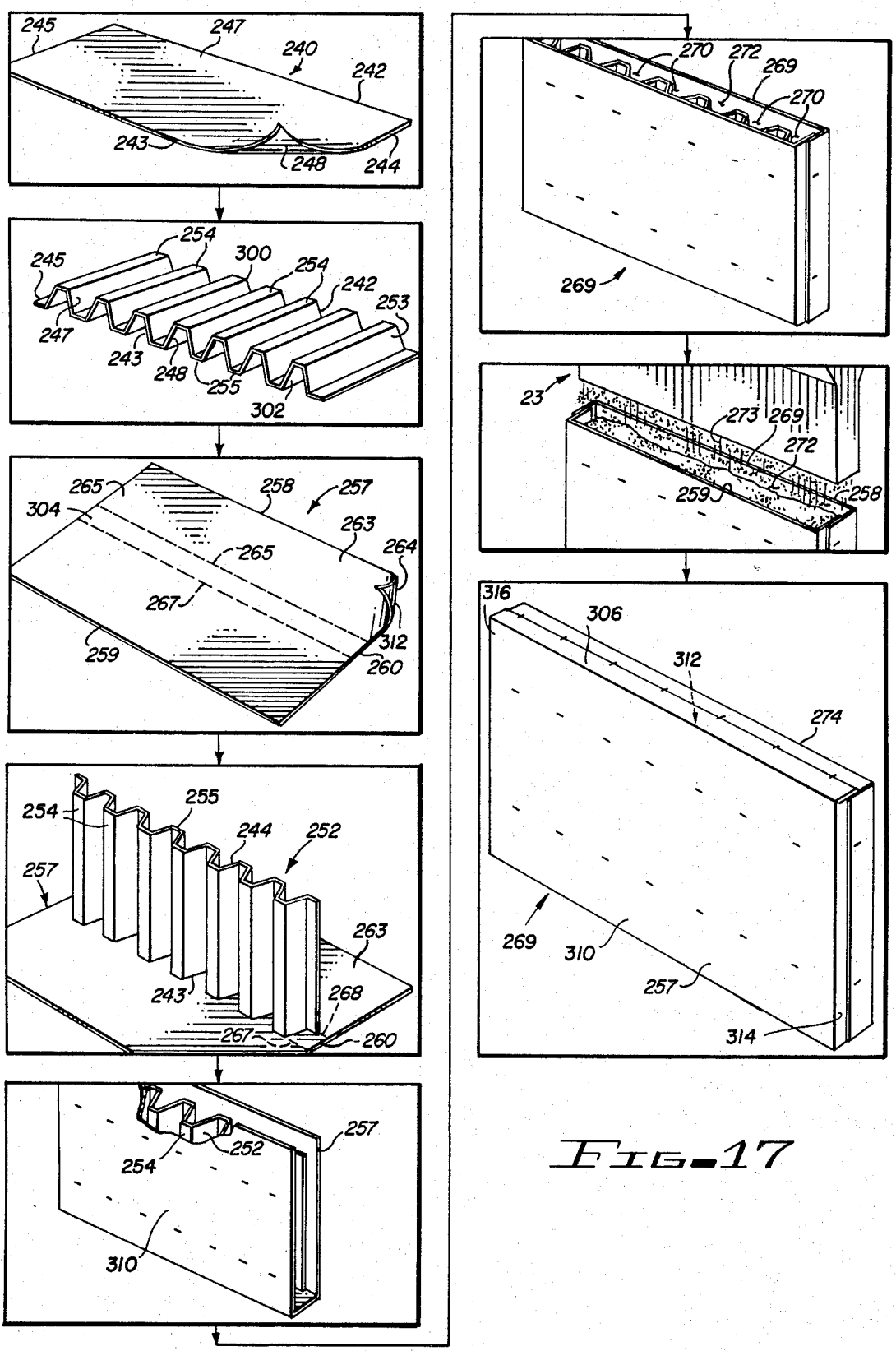
FIG. 17 is a semi-pictorial flow diagram illustrating the method of fabricating an insulative panel in accordance with the teachings of the instant invention.

Referring now to FIG. 17, there is seen a generally rectangular filler or divider sheet 240, having first and second longitudinal edges 242 and 243, respectively, first and second lateral edges 244 and 245, respectively, and first and second faces 247 and 248, respectively. Preferably, divider sheet 240 is of heavy weight paper or cardboard stock which has been treated for resistence to vermin, fire and moisture.

As seen in FIG. 1, a roll 248 of sheet material 249 is supported by stand 250 at the left end of first table 20. With press 24 at the right end of first table 20, the desired quantity of sheet material 249 to form sheet 240 is pulled from roll 248 over die 60 and severed by any convenient means. Punch 74 is then moved leftward over die 60. As punch element 77 sequentially moves into recesses 73, sheet 240 is embossed or pressed to assume the pattern of die 60.

The action of press 24, or, alternatively, projections 189 of transfer means 22, forms accordian fold or corrugated divider sheet 252 as seen in FIG. 17. For purposes of orientation, the edges and faces of accordian fold sheet 252 are designated with the reference characters of corresponding elements of filler sheet 240. Accordian fold sheet 252 further includes a plurality of alternating ridges 300 and grooves 302 having oppositely directed truncated longitudinal apexes 254 or 255 respectively. The immediate step of the method, in accordance with the instant invention, is the formation of divider sheet 252 from filler sheet 240. Illustrated is a specific configuration of an accordian fold sheet. It is within the scope of the invention that sheet 240 may be alternately corrugated into other configurations such as peaked or rounded apexes. The purpose of the corrugations is to make available a rigid truss support as will become apparent presently.

With panels 124 and 132 of second table 21 substantially horizontal and in the plane of center section 117, a generally rectangular envelope sheet 257 is placed over top surface 118 and inner faces 130 and 138. Envelope sheet 257, which is preferably cut from foldable treated paper stock, includes first and second longitudinal edges 258 and 259, respectively, first and second lateral edges 260 and 262, respectively, and first and second sides 263 and 264, respectively.

A pair of spaced apart folding lines 265 and 267 are shown in broken line configuration extending longitudinally of envelope sheet 257, approximately centered between longitudinal edges 258 and 259. Folding lines 265 and 267 are spaced apart to correspond with the spacing the distance between apexes 254, 255 of corrugated sheet 252. Folding lines 265 and 267 define base 304 of envelope 269 and indicate the lines along which envelope sheet 260 are to be folded and may or may not actually be drawn as reference guides along sheet 260.

Corrugated divider 252 is placed upon envelope sheet 260 with either edge 243 or 244 aligned between folding lines 265 and 267. Mechanically, in accordance with the apparatus of the instant invention, this function is performed by transfer means 22. Operating ram 54 is extended from hydraulic cylinder 52, tilting top 29 of first table 20 into the vertical position. Transfer means 22 is moved along guide tracks 162 and 163 in a direction toward accordian fold sheet 252, which is nested and held within die 60. During movement, plate 180 is lowered in response to hydraulic cylinder 184 until the upper edge of accordian fold sheet 252 resides intermediate the upper and lower ends of projections 189. Movement is continued until projections 189 abut accordian fold sheet 252, projections 189 being matingly received within the corrugations of accordian fold sheet 252 as is best seen in FIG. 11.

After abutment of projections 189 with corrugated divider sheet 252, lowering of plate 180 is continued until plate 180 is in close proximity to the upper edge, 253 or 244, or accordian fold sheet 252. During this movement, fingers 198 pass over accordian fold sheet 252 which is grasped at several locations between projections 189 and respective fingers 198. Ram 187 is then retracted, urging plate 180 upwardly and lifting accordian fold sheet 252 from first table 20.

Plate 180 is lifted upwardly a sufficient distance that the lower edge 243 or 244 of accordian fold sheet 252 is positioned above second table 21. Transfer means 22 is now moved along guide tracks 162 and 163 until accordian fold sheet 252 resides above center section 117. Plate 180 is now lowered, placing accordian fold sheet 252 upon envelope sheet 260 in the position as illustrated in FIG. 17.

The next step involves folding envelope sheet 260 about accordian fold sheet 252 to form a substantially rectangular parallelepiped envelope 269. This step is accomplished in sequential operations, first folding sheet 260 against the sides 247 and 248 of accordian fold sheet 252 and subsequently folding envelope sheet 260 about the ends 244 and 245 of accordian fold sheet 252. The folded portions of sheet 260 are then secured to accordian fold sheet 252. As a result of this step, a rigid envelope 269 is formed, having a plurality of partitioned right prismatic compartments 270 therein extending from face 304 to the top face 306 of envelope 269 which is initially left open. Each compartment 270 is generally rigid, triangular in cross section, bounded on two sides by panels 253 and on the third side by the front envelope sheet and rear faces 310, 312 and 269.

To summarize, an intermediate step of the method of fabricating the insulation panel is the formation of an accordian divide sheet from filler sheet 240. Sheet 240 is embossed or pressed to assume the pattern of die 60 by moving punch element 77 sequentially into recesses 73. The resultant accordian fold, or corrugated sheet 252 is abuted matingly with projections 189 which depend from plate 180. Plate 180, with sheet 252, is lowered onto envelope sheet 260 so as to plate accordian fold sheet 252 in the position illustrated in FIG. 17. Sheet 260 is then folded against sides 247 and 248 of corrugated divider sheet 252. Subsequently, the folded portions of sheet 260 front and rear faces 310, 312 and side faces 314, 316 are secured to divider sheet 252 which results in the formation of a rigid envelope 269, having a plurality of rigid partitioned compartments 270 therein. Each compartment is generally triangular in cross-section and is bounded on two sides by panels of sheet 252 and on the third side by either front face 310 or rear face 312 of envelope 259.

As is obvious from the illustrations of FIGS. 11 and 17, the securing of faces 310, 312 of envelope 269 to the sides of corrugated sheet 252 forms a rigid truss structure. Structures such as those illustrated are quite familiar to those skilled in the art. The mechanical advantages of a truss permit the use of structural materials which, in a truss structure, are capable of bearing greater loads than the elements alone are nominally capable of. Those skilled in the art will immediately recognize that the fabrication technique espoused herein are those which will provide a rigid panel, or structure by virtue of the truss reinforcements which result from securing envelope 269 to corrugated divider sheet 252 in the manner disclosed herein.

The sequential folding of envelope sheet 260 and other sub-steps associated therewith is best explained in connection with the sequential operation of the apparatus of the instant invention, especially second table 21. First and second panels 124 and 132, respectively, of second table 21 are contractively moved, upwardly and inwardly, pivoting along hinged assemblies 131 and 139, respectively, folding envelope sheet 260 along folding lines 265 and 267 and pressing front face 310 against apexes 254 and rear face 312 against apexes 255 of corrugated divider sheet 252. First and second narrow flaps 145 and 147 associated with second panel 132 are then contractively moved, folding the respective terminal marginal portions of envelope sheet 260 inwardly against the first and second lateral edges 244 and 245 of accordian fold sheet 252 to form side faces 314, 316 of envelope 269. It is noted that the respective marginal portion of envelope sheet 260 is substantially wider than either narrow flap 245 of side 247. Subsequently, first and second wide flaps 142 and 143, associated with first panel 124, are contractively moved, folding the respective terminal marginal portions of envelope sheet 260 inwardly over the respective marginal portions folded by narrow flaps 145 and 147.

The partially formed rigid panel structure is now secured together. The several stapling heads 153, carried by the panels 124 and 132 are now activated, stapling front and rear faces 310, 312 envelope sheet 269 to the truncated apexes 254 and 255 of divider sheet 252. The several stapling heads 153, carried by panels 124 and 132, are positioned adjacent selected apexes 254 and 255. Stapling heads 153, carried by flaps 142 and 143 are also activated, joining together the respective marginal portions of envelope sheet 260 to form side faces 314, 316. During stapling, the structure is supported by the several projections 189 and the two projections 194.

Subsequent to the stapling operation, plate 180 is moved upwardly, retracting the projections 189 and 194 from the partially formed insulation panel structure. The partially formed insulation structure at this time is in the form of a rectangular parallelipped envelope 269, having prismatic compartments 270 with the top face 310 of envelope 269 open or unopened at this step of the process.

Receptacle 23 contains a supply of granular loose fill insulation material, such as ground treated paper, commonly referred to as cellulose. In response to rotation of shafts 213, 214 and 215, blades 217 move through the supply or granular loose fill material, preventing the material from becoming compacted and insuring smooth even flow through opening 211 into the filler means, including upper and lower telescoping elements 218 and 219. Lower butterfly valve 223 is closed and upper butterfly valve 220 is open, allowing the granular loose fill material to flow into the filler means. After the filler means is filled with granular loose fill material, butterfly valve 220 is closed, entrapping a measured quantity of granular loose fill material within the filler means. As previously described, bolts 227 are used to vary the distance between butterfly valves 224 and 220, which determines the quantity of granular loose fill material held within the filler means.

The final steps include filling envelope 269 with granular loose fill insulated material 273 through opening 272, folding the terminal portions of envelope 257 adjacent longitudinal edges 258 and 259 to form top face 310 of envelope 269 and to close opening 272, by securing the terminal portions in the closed position to complete fabrication of insulative panel, or structure 274, as seen in FIG. 17. During the final steps, panels 124 and 132 of second table 21 remain in the contracted position to support the partially completed panel structure. Second table 21 is moved along rails 158 and 159 to a fill position under receptacle 23. Opening 225 of lower telescoping element 219 is sized and shaped to correspond with the size and shape of opening 272. Second table 21 is guided by rails 158 and 159 to a position wherein opening 272 aligns with opening 225.

Upon opening butterfly valve 223, granular loose fill insulative material within the fill means between butterfly vales 223 and 220 moves under force of gravity from telescoping elements 218 and 219 downwardly through opening 272 into envelope 269. Second table 21 is then moved along rails 158 and 159 to the original position adjacent first table 20.

Narrow longitudinal flap 144, associated with panel 132, is folded inwardly, bringing the terminal portion of envelope 260 adjacent edge 259 over opening 272 to form top face. Wide longitudinal flap 140, associated with panel 124, is then moved inwardly, folding the terminal portion of envelope 260 adjacent longitudinal lines 258 over edge 259. The arrangement is best seen in FIG. 12. The several stapling heads 153, carried by flap 140, are then activated, placing periodic staples between edges 258 and 259 and sealingly closing opening 272. Finally, panels 124 and 132 are lowered to the horizontal position and the finished insulative panel removed from the apparatus.

The foregoing detailed description describes an embodiment of an insulative panel wherein the envelope sheet is bonded to accordian fold sheet by means of staples. It is also specifically described that portions of the envelope sheet are overlapped and secured together to close the lateral edges and a longitudinal edge of the panel. It is within the scope of the instant invention that other specific types of bonding are employed. For example, the panels 124 and 132 of second table 21, may be devoid of the respective flaps and the closing and bonding of the envelope sheet accomplished by a suitable tape. It is also contemplated that the bonding may be accomplished by an adhesive coating applied at the points of contact within the panel structure. Two-sided adhesive tape may also be utilized to achieve the bonding of all the various elements of the rigid insulation panel.

The latter method suggests the use of a commercially available pressure sensitive paper. The paper is adhesively treated on one side thereof. The adhesive has the unique property of bonding only to another surface so adhesively treated. An envelope sheet fabricated of adhesively trated paper is positioned such that the adhesive is carried on the side adjacent the accordian fold sheet. Accordingly, the envelope sheet will adhere to the adhesively treated side of the accordian fold sheet. The other side of the accordian fold sheet, the non-treated side, can be bonded to the envelope sheet by use of additional adhesive, or stapling, as previously described.

Figure 14:
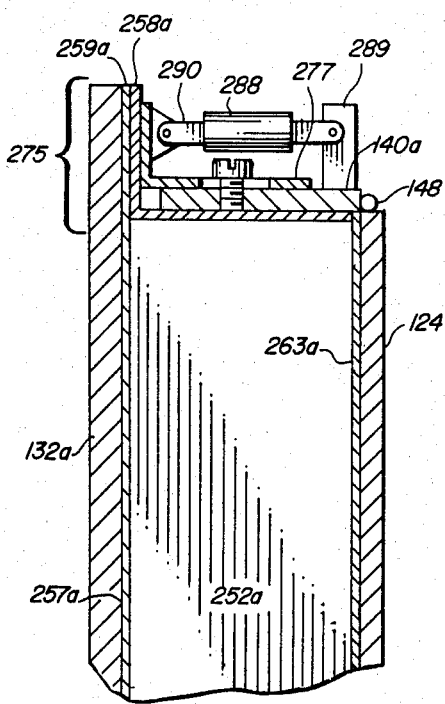
FIG. 14 is a fragmentary vertical sectional view generally corresponding to the upper portion of the illustration of FIG. 12 and showing an alternate embodiment thereof.
Figure 15:
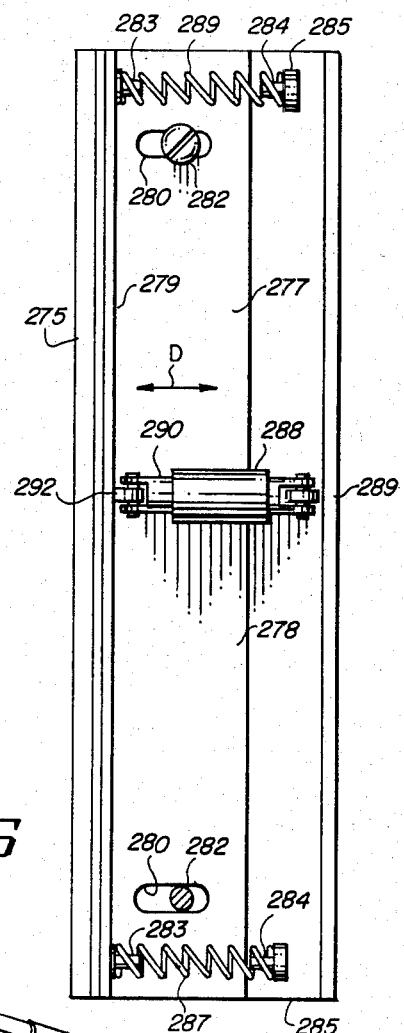
FIG. 15 is a top plan view of the alternate embodiment of FIG. 14.

FIGS. 14 and 15 illustrate an alternate embodiment of the invention especially adapted for use with accordian fold sheet and an envelope sheet to which an adhesive has been applied. Shown is an alternate embodiment of the previously described second panel, designated by the reference character 132a, which is similar to the previously described second panel 132 except that the flaps 144, 145 and 157 have been discarded in favor of extending the size of panel 132a to include a terminal marginal portion 275 extending beyond each of the previously described edges 134, 135 and 137. The three marginal portions 275 act as anvils as will be further explained presently.

The several flaps associated with first panel 124 are devoid of stapling heads and have been extended to nearly the width between panels 124 and 132a when in the contracted position. Specifically illustrated in FIGS. 14 and 15 is the modified longitudinal flap designated by the reference character 140a, which is also typical of the lateral flaps.

An elongate abutment member 277 is movably carried by flap 140a. Abutment member 277 is generally L-shaped in cross-section having a first side 278 and a second side 279 which is parallel to the marginal portion 275 of panel 132a. A pair of spaced apart slots 280 extend through first side 278 perpendicular to second side 279. A bolt 282 is slidably received through each slot 280 and threadedly engaged within flap 140a. Accordingly, abutment member 277 is movable in a direction toward and a direction away from marginal portion 275 as illustrated by the double arrowed line D.

Extending perpendicularly from second side 279 are a pair of spaced apart pins 283 each of which is aligned with one of a second pair of pins 284 carried by tabs 285 extending upwardly from flap 140a. A compression spring 287 extends between second side 279 and each tab 285. Each compression spring 287 is retained by having a respective end encircling pins 283 and 284.

Compression springs 287 normally urge second side 279 of abutment member 277 against marginal or anvil portion 275 of panel 132a.

A hydraulic cylinder 288 resides along abutment member 277 intermediate springs 287 and screws 282. Hydraulic cylinder 288 is secured to flap 140a by means of lug 298 extending from flap 140a. Ram 290 extending from hydraulic cylinder 288 is secured to second side 279 of abutment member 277 by bracket 292. Hydraulic cylinder 288 is of a conventional commercially available type, the operation and control of which will be readily apparent to those skilled in the art. Hydraulic cylinder 288 is of sufficient strength to overcome springs 287 and urge abutment member 277 in a direction away from anvil portion 275.

FIG. 14 further illustrates an alternate accordian fold sheet 252a which is generally similar to the previously described accordian fold sheet 252, except having been treated with an adhesive on at least one side thereof. Alternate envelope sheet 257a is generally similar to previously described envelope 257, except having an adhesive coating on the first side 263a thereof. Also, envelope sheet 257a is extended adjacent edge 258a. Accordian fold sheet 252a is formed as previously described. Panels 124 and 132a are contracted folding envelope sheet 257a about accordian fold sheet 252, also as previously described. During contractive movement of the panels 124 and 132a, the flaps, as represented by flap 140a, associated with panel 124, are held in a position in the plane of panel 124. In the contracted position, panels 124 and 132a exert sufficient force to adhesively bond envelope sheet 257a to accordian fold sheet 252a.

After panels 124 and 132a have been contracted, the lateral flaps associated with panel 124, as represented in the illustration of FIG. 14 by flap 140a, are folded inwardly securing envelope sheet 257 to the lateral edges of accordian fold sheet 252a. During the movement of the lateral flaps, the respective hydraulic cylinder 288 is maintained in the retracted position wherein the respective abutment members 277 are held in a position spaced from the respective anvil portion 275. Thereafter, the hydraulic cylinders 288 are relaxed at which time springs 287 urge abutment member 277 toward panel 132a pressing the edge portions of envelope sheet 263a between anvil portion 275 and second side 279. The insulative panel structure is then filled as previously described. Subsequently, the opening is closed by manipulating flap 140a and abutment member 277 as set forth above.

It is to be understood that while flap 140a has been specifically described as the longitudinal flap associated with panel 124, FIGS. 14 and 15 are also illustrative of the flaps associated with either lateral edge of panel 124. Further, it is pointed out that while springs 287 were specifically described as compression springs and cylinder 288 was specifically described as contracting during the energized position, it is within the scope of the instant invention that springs 287 may be tension springs for urging abutment member 277 in a direction away from anvil portion 275. Correspondingly, cylinder 288 extends when energized to urge abutment member 277 against anvil position 275.

Figure 16:
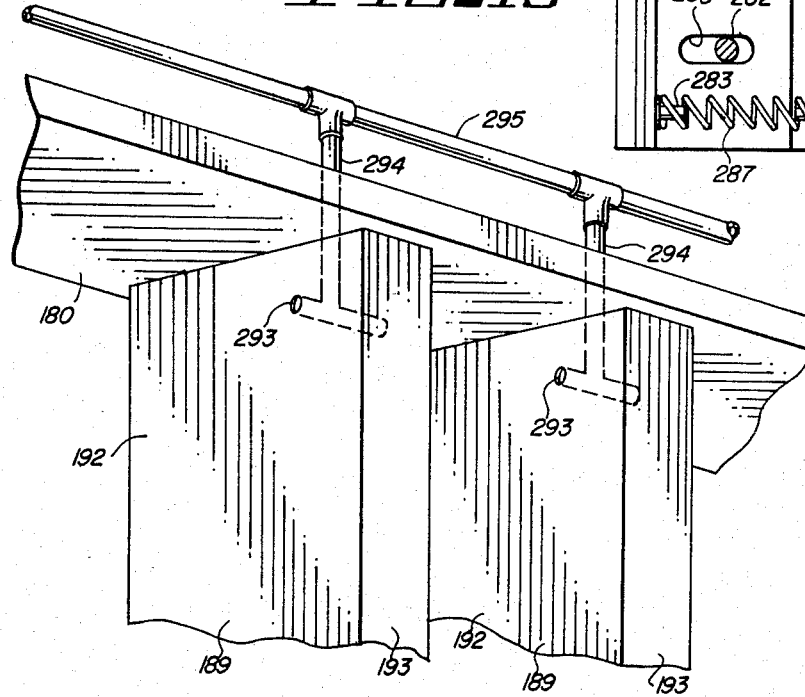
FIG. 16 is a fragmentary perspective view of the transfer means generally corresponding to the view of FIG. 10 and showing an alternate embodiment thereof.

FIGS. 9 and 10 illustrate a plurality of fingers 198 cooperating with projections 189 for the specific purpose of grasping accordian fold sheet 252. FIG. 16 illustrates alternate means for grasping the accordian fold sheet. An opening 293 is formed through projections 189. While openings 293 are specifically shown as extending through second sides 192, it is relatively unimportant whether openings 293 extend through first side 190, second side 192 or end 193. Further, it is not necessary that an opening 293 be associated with each projection 189.

A conduit 294 extends from each opening 293. The several conduits 294 are connected by manifold 295. Although not specifically illustrated, but as will readily occur to those skilled in the art, manifold 295 is connected to a source of vacuum, such as an electric driven vacuum pump. A control, such as a valve also not shown, is situated to control the application of vacuum to manifold 295. After the several projections 192 have been brought into abutment against the accordian fold sheet 252 as previously described, the control is manipulated to draw a vacuum in manifold 295. Accordingly, the vacuum at each opening 293 draws accordian fold sheet 252 against the several projections 189 and holds the accordian fold sheet during movement by the transfer means. After the accordian fold sheet has been placed upon the envelope sheet overlying the second table, the control is again manipulated releasing the vacuum and freeing the accordian sheet from the projections 189.

Various modifications and variations to the apparatus and method herein chosen for purposes of illustration will readily occur to those skilled in the art. To the extent that such modifications and variations do not depart from the spirit of the invention, they are intended to be included within the scope thereof which is determined only by a fair assessment of the appended claims.

Having fully described and disclosed the present invention and preferred embodiments thereof in such clear and concise terms as to enable those skilled in the art to understand and practice the same, the invention claimed is:

1. An apparatus for receiving selected components including,
    a rectangular filler sheet having a pair of parallel longitudinal edges, a pair of parallel lateral edges, and a pair of opposed faces,
    an envelope sheet having a pair of opposed faces, and
    a supply of granular loose fill insulative material, said insulative material being of the type conventionally intended for pneumatic or poured application on horizontal surface installations,
and for fabricating a rigid insulative panel from said components, said apparatus comprising:
    a base;
    a press supported by said base for receiving said filler sheet and impressing selected lateral sections thereof to form a laterally folded sheet therefrom, wherein said press includes:
    (a) a die for receiving said filler sheet and having a plurality of spaced apart die elements defining a plurality of spaced apart recesses therebetween;
    (b) a punch having a plurality of spaced apart punch elements extending therefrom, said punch elements being matingly receivable within said recesses between said die elements; and
    (c) means for moving said punch relative said die and for urging said punch elements into said recesses for impressing lateral portions of said filler sheet into said recesses and forming said folded sheet wherein said punch elements extend longitudinal of said punch, said punch being carried by a guide means for movement relative said die, said guide means includes:

(a) a frame movable along said press and secured against upward movement therefrom; and (b) biasing means urging said punch elements downwardly against said die a table supported by said base for receiving said envelope sheet and said folded sheet;

first and second rectangular panels, each having inner and outer longitudinal edges, first and second lateral edges, and an inner face, said inner longitudinal edges being spaced apart and hingedly mounted on said table, said first and said second panels being contractively movable to fold said envelope sheet against the faces of said folded sheet to form a partitioned structure having an open top, a pair of lateral flaps, one hingedly secured along either lateral edge of said second panel and inwardly movable to fold said envelope sheet against a respective lateral edge of said folded sheet, including a longitudinal flap hingedly secured along the outer longitudinal edge of said second panel and inwardly movable to fold said envelope sheet and close said opening, including:

(a) marginal anvil portions carried proximate the outer longitudinal edge and the first and second lateral edges of said first panel, said anvil portions extending beyond the respective edges of said folded sheet; and (b) an abutment member carried by each of said flaps for pressing the respective marginal portion of said envelope sheet against the respective anvil portion;

a receptacle for holding said supply and loose fill insulative material; and filler means cooperating between said receptacle and said partitioned structure for depositing said insulation into said structure through said open top.

2. The apparatus of claim 1, wherein each said abutment member is movable in a first direction toward the respective said anvil portion and in a second direction away from the respective said anvil portion.

3. The apparatus of claim 2, further including:
(a) biasing means normally urging said abutment member in said first direction; and
(b) means for selectively urging said abutment member in said second direction.

4. The apparatus of claim 3, further including:
(a) biasing means normally urging said abutment member in said second direction; and
(b) means for selectively urging said abutment member in said first direction.

5. The apparatus of claim 1, wherein said filler means is in the form of a projection depending from said receptacle for holding a selected quantity of said loose fill insulative material and includes:
(a) an outlet sized and shaped to approximate the opening in said structure;
(b) an inlet valve communicating between said filler means and said projection for controlling the flow of said insulative material from said receptacle into said projection; and
(c) an outlet valve spaced below said inlet valve for controlling the flow of said insulative material from said projection into said structure.

6. The apparatus of claim 5, wherein said projection includes:
(a) an upper section secured to said receptacle and carrying said inlet valve;
(b) a lower section coupled to said upper section and carrying said outlet valve; and
(c) locking means for securing said lower section to said upper section at selective locations.

7. The apparatus of claim 1, wherein said press is hingedly affixed to said base and movable between a substantially horizontal position and a substantially vertical position.

8. The apparatus of claim 1, further including transfer means movable between said press and said table for lifting said folded sheet from said press and placing said folded sheet upon said table.

9. The apparatus of claim 8, wherein said transfer means includes:
(a) projection means receivable against said folded sheet; and
(b) grasping means for selectively holding and releasing said folded sheet.

10. The apparatus of claim 9, further including a plurality of said projection means being spaced, sized and shaped to be matingly received with the impressed sections of said folded sheet.

11. The apparatus of claim 9, wherein said grasping means includes a resilient finger adjacent said projection means for receiving an edge of said folded sheet in clamping engagement therebetween.

12. The apparatus of claim 9, wherein said grasping means includes:
(a) an opening in said projection means; and
(b) means for selectively applying a vacuum within said opening.

13. The apparatus of claim 9, wherein said projection means and said grasping means are vertically movable relative said table.

* * * * *